June 8, 1965  W. C. READEL ETAL  3,187,874
ARTICLE CONVEYING AND DISTRIBUTING SYSTEM
Filed March 6, 1963  6 Sheets-Sheet 1

INVENTORS
WILLIAM C. READEL
DONALD E. FLINCHBAUGH
BY
William R. Liberman
ATTORNEY INVENTORS
WILLIAM C. READEL
DONALD E. FLINCHBAUGH
BY William R. Liberman
ATTORNEY

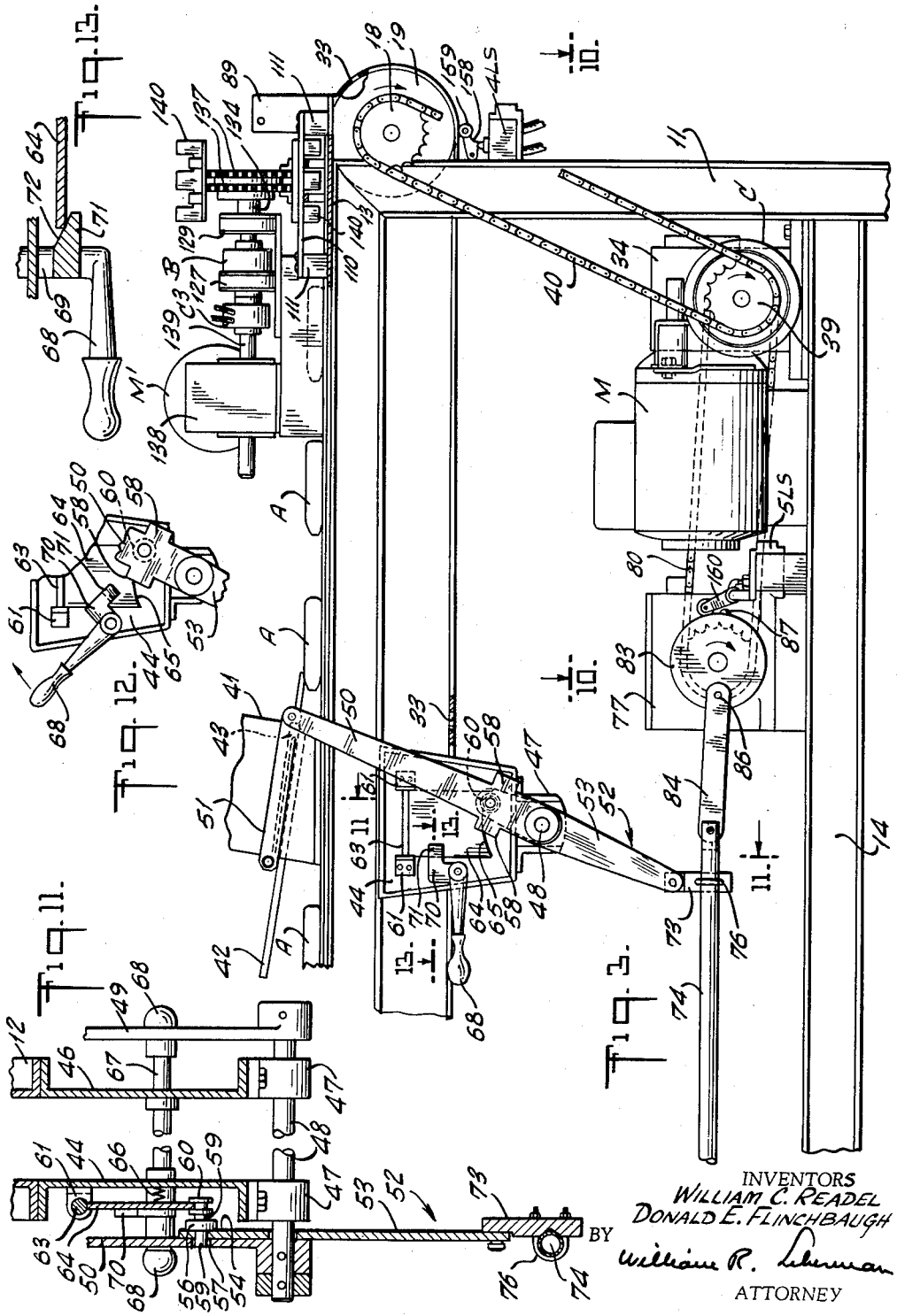

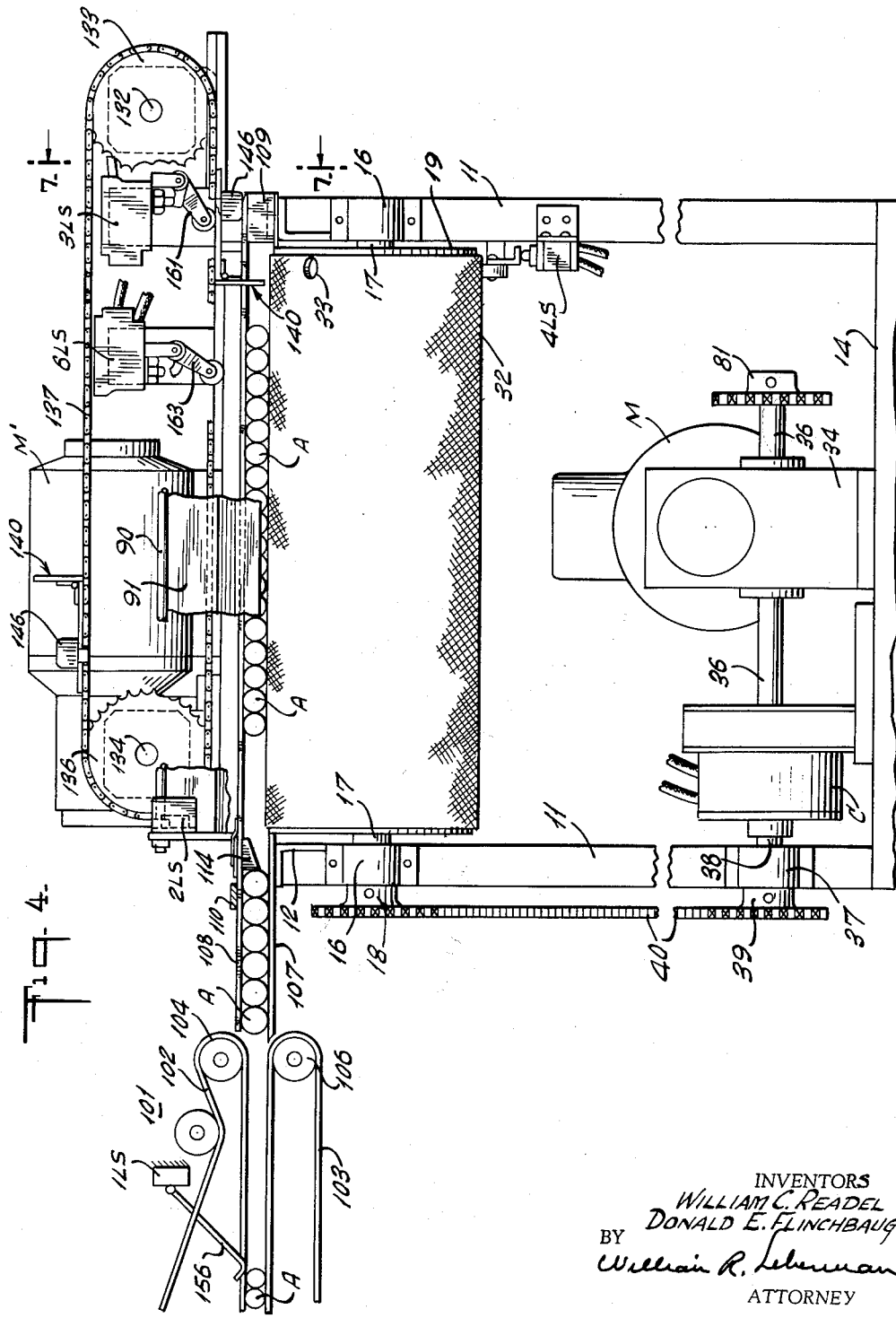

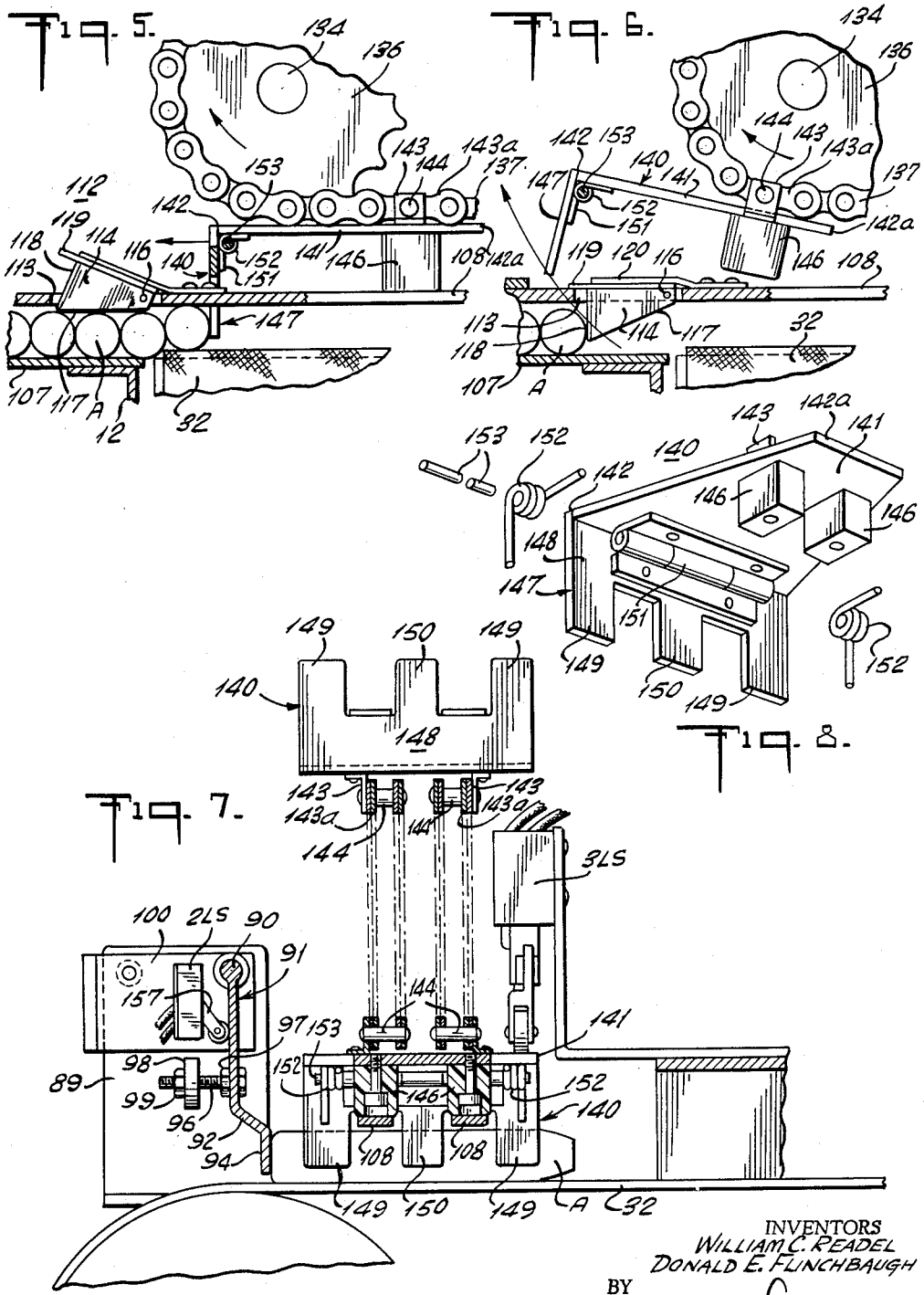

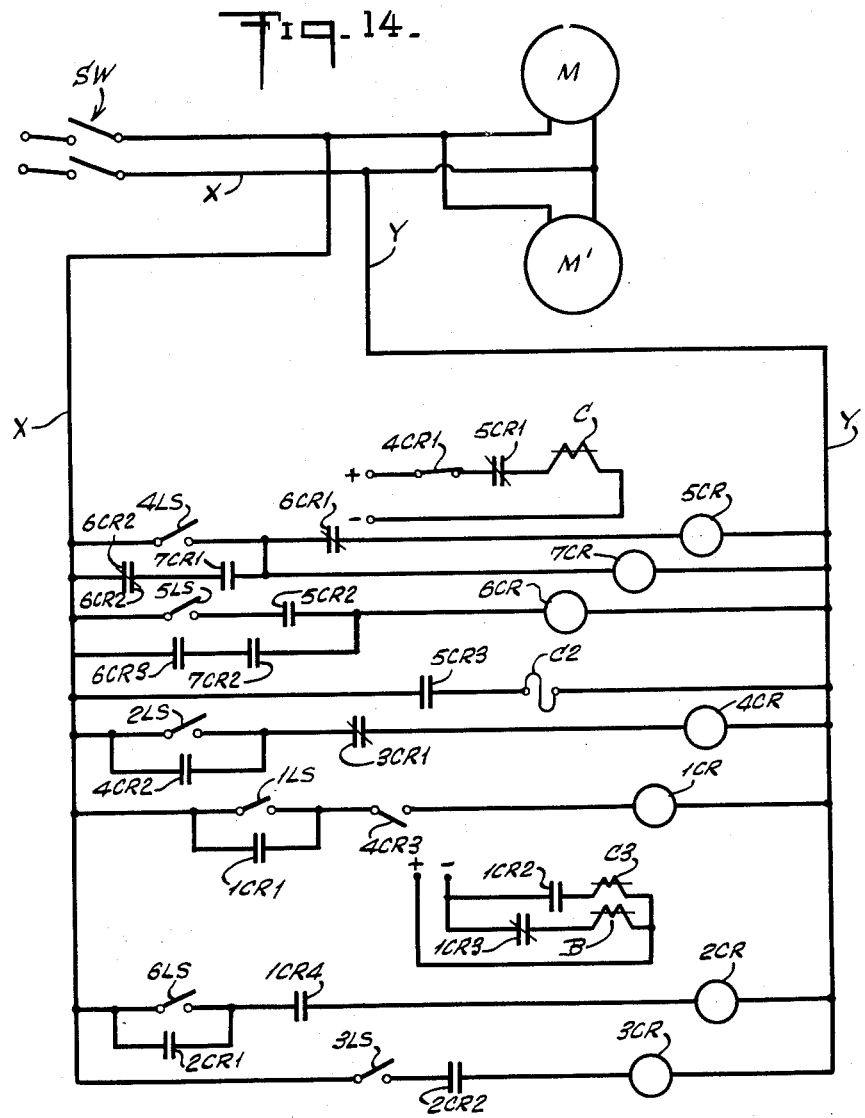

United States Patent Office 3,187,874
Patented June 8, 1965

3,187,874
ARTICLE CONVEYING AND DISTRIBUTING SYSTEM
William C. Readel, Bloomsburg, and Donald E. Flinchbaugh, York, Pa., assignors to Consolidated Cigar Corporation, New York, N.Y., a corporation of Delaware
Filed Mar. 6, 1963, Ser. No. 263,296
14 Claims. (Cl. 198—30)

The present invention relates generally to improvements in article conveying and distributing systems. It relates, in particular, to an improved system for receiving articles from a plurality of first handling or treating devices at a plurality of inspection stations and then conveying the articles from the inspection stations to a common means for handling the articles thereafter.

In the packaging of such articles, as cigars, the cigars are first individually banded and then individually wrapped in cellophane, or some other transparent material. The cigars are then inspected and loaded into trays and trucks. Thereafter, they are transported to another location where they are hand-fed into a high speed machine and by it packaged in predetermined numbers. The above procedure, conventionally followed, is highly time- and labor-consuming, and is thus expensive. Moreover, the space requirements as well as the truck and tray requirements are considerable. There are numerous other drawbacks and disadvantages to conventional practices which otherwise leave much to be desired.

It is thus a principal object of the present invention to provide an improved article conveying and distributing system.

Another object of the present invention is to provide an improved apparatus for conveying articles from a plurality of inspection stations to a common article handling machine.

A further object of the present invention is to provide an improved conveying system which transports articles from a plurality of spaced feed devices to a packaging machine in accordance with the requirements of the packaging machine.

A still further object of the present invention is to provide an improved conveyor for feeding a packaging machine, which conveyor is provided with means for transferring articles from said conveyor in accordance with the requirements of the packaging machine.

An additional object of the present invention is to provide a conveying system of the above nature characterized by its ruggedness, simplicity and efficiency of operation.

The above and other objects of the present invention will in part be apparent from a reading of the following description and in part be specifically pointed out therein, taken in conjunction with the accompanying drawings, which illustrate one form of machine constructed according to and embodying the present invention, wherein FIGURE 1 is a front elevational view of an improved conveying and distributing apparatus embodying the present invention;

FIGURE 3 is a fragmentary sectional view taken along the line 3—3 of FIGURE 2;

FIGURE 4 is a fragmentary front end elevational view of the present apparatus;

FIGURE 5 is an enlarged, detailed, fragmentary front view of the article transfer section of the present apparatus, illustrated during the article-transfer sequence;

FIGURE 6 is a view similar to FIGURE 5 illustrated following the article-transfer sequence;

FIGURE 7 is an enlarged detailed sectional view taken along the line 7—7 of FIGURE 4;

FIGURE 8 is an exploded perspective view of the article pusher member;

FIGURE 9 is a fragmentary side elevational view of the trailing section of the article conveyor;

FIGURE 10 is a sectional view taken along the line 10—10 of FIGURE 3;

FIGURE 11 is a sectional view taken along the line 11—11 of FIGURE 3;

FIGURE 12 is a fragmentary side view of the hopper feed coupling assembly in the hopper feed disengage position;

FIGURE 13 is a sectional view taken along line 13—13 of FIGURE 3; and

FIGURE 14 is a diagrammatic view of a circuit network which controls the operation of the present apparatus.

Figure 1:
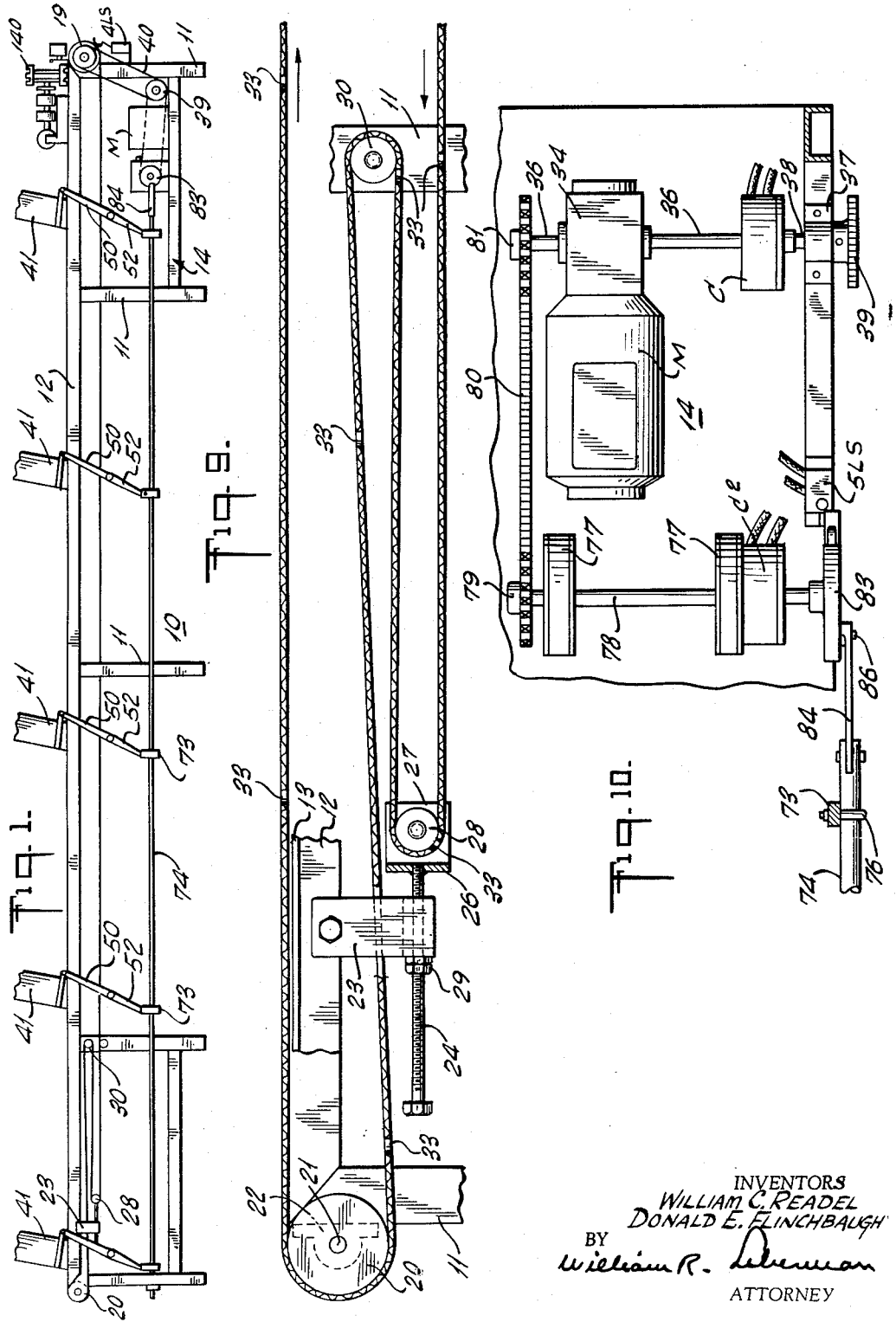
Figure 2:
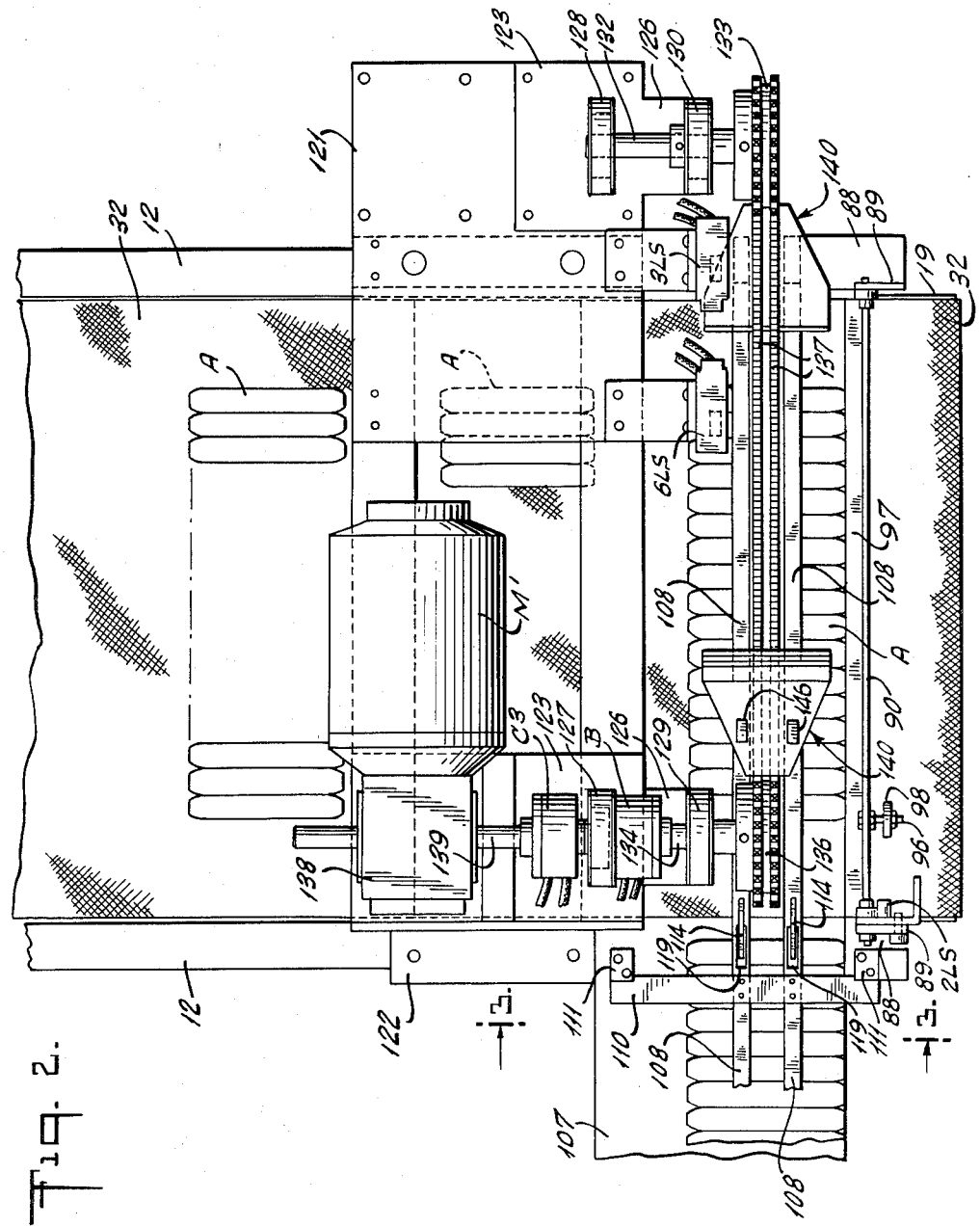
FIGURE 2 is a top plan, fragmentary, view of the article transfer section thereof.

In a sense, the present invention contemplates the provision of an article-handling apparatus comprising an endless conveyor including successive longitudinal groups of a predetermined number of substantially equal increments and successive indicia longitudinally-spaced by said predetermined number of increments, a plurality of longitudinally-spaced intermittently actuatable article-delivering means disposed along said conveyor, the spacing between successive delivery means being a multiple of said increments different than the number of increments in said group and said delivery means registering with different increments of said respective groups, a first sensing means actuated by said indicia, selectively actuatable means advancing said conveyor from the trailing end toward the leading end thereof, and means responsive to said sensing means deactivating said advancing means and concurrently activating said plurality of article-delivery means.

According to a preferred form of the present apparatus, the conveyor is in the form of an endless belt extending in its forward run over a pair of longitudinally-spaced drums and in its return run traverses a zig-zag path about a pair of longitudinally-spaced idler rolls, at least one of which is longitudinally adjustable. The article-delivery means are defined by hoppers having slidable discharge members registering with the hopper discharge openings and connected by way of a common reciprocating rod to an eccentric connected through an electrically actuated clutch to a drive shaft. A swingable flap extends across the discharge end of the conveyor and when engaged by articles on the conveyor actuates a switch to disable the conveyor advancing means and the article delivery means. Located at the side of the conveyor adjacent to its discharge end is an article receiving and advancing device, and an article transfer mechanism is located above the discharge end of the conveyor and includes a transversely extending conveyor chain for supporting and advancing a pusher across the conveyor. A sensing member is located on the receiver and in the absence of a registering article actuates a chain drive to advance the pusher and transfer articles from the conveyor to the receiver. Means are provided to disable the transfer means in the absence of articles engaging the sensing flap. A dog is located in the transfer path of the articles to restrict their movement to a forward direction.

Referring now to the drawings which illustrates a preferred embodiment of the present invention as applied to the handling and feeding of cigars, the reference numeral 10 generally designates an elongated conveyor table including a plurality of longitudinally-spaced pairs of support legs 11, carrying a top frame 12 upon which is mounted a table top 13 defining a conveyor belt base plate. A motor drive mount platform 14 is supported by and between the forward two pairs of legs 11, upwards of the lower end thereof. Affixed to the front faces of the forward legs 11, below the tops thereof, are a pair of horizontally aligned bearing blocks 16 in which is journalled a transverse horizontal shaft 17 projecting beyond one of the bearing blocks 16 and having affixed to its free end a sprocket wheel 18. A first drum 19 is also affixed to the shaft 17 between the legs 11, with its upper peripheral surface at substantially the level of table top 13 and adjacent its leading end. A second idler drum 20 is journalled by means of a shaft 21 to bearing blocks 22 carried by the rear legs 11, which drum 20 also has an upper surface also at the level of but adjacent to the trailing edge of table top 13 (FIG. 9).

Depending from and affixed to opposite sides of frame member 12, forward of trailing legs 11, are a pair of arms 23 which support at their lower ends longitudinally bored blocks which slidably engage long screw bolts 24 extending through the blocks. A transverse bar 26 extends between and is affixed to the leading ends of the screws 24 and carries at its opposite ends a pair of forwardly directed bracket plates 27. Journalled to and between the bracket plates 27 is a first idler roll 28. In order to permit longitudinal adjustment of first idler roll 28, each screw 24 carries a pair of mating nuts 29 which define adjusting and lock nuts respectively, the leading nut bearing on the corresponding block carried by the arm 23. A second transverse idler roll 30 is journalled to and between a pair of legs 11 next adjacent the trailing legs and slightly above the level of first idler roll 28.

An endless conveyor belt 32 formed of any suitable material traverses an upper advance run from trailing drum 20 along table top 13 to leading drum 19. Thereafter, it travels over and around the periphery of drum 19 and then rearwardly to the underface of idler roll 28, around idler roll 28 and forwardly to the underface of idler roll 30, thence around idler roll 30 and again rearwardly and around idler drum 20 to complete the path of the belt. The length of belt 32 is equal substantially to an exact multiple of the length of a group of equal increments, as will hereinafter be identified. The longitudinally adjustable idler roll 28 permits the accommodation of belt 32 to a longitudinal support of non-matching length. A plurality of regularly, longitudinally-spaced indicia-defining apertures 33 are formed in belt 32 along a longitudinal edge thereof, the distance between successive apertures 33 being equal to the length of a said group of a predetermined number of said increments.

A main drive electric motor M is mounted on platform 14 and is connected through gear reduction unit 34 to a low speed double ended transverse output shaft 36. A bearing block 37 is mounted along a side edge of platform 14 and has journalled therein a transverse shaft 38 coaxial with shaft 36. Affixed to the outer end of shaft 38 is a sprocket wheel 39 which is coupled to front drum sprocket wheel 18 by means of a sprocket chain 40. The inner end of shaft 38 is connected to one end of shaft 36 by way of a conventional electric clutch C, which is in engage position upon electrical energization thereof and in disengage position upon deenergization.

The cigar feed system includes a plurality of feed hoppers 41 positioned along the length of and above the conveyor belt 32, the spacing between the feed hoppers and their construction being described in detail in the copending application of Moritz C. Boesch, Serial No. 64,332, filed October 24, 1960. In the illustrated embodiment, where five feed hoppers 41 are employed, the distance between successive hoppers is advantageously equal to six increments, each increment being equal in length to the length of a cigar, in addition to the desired spacing between successive rows of cigars as conveyed by belt 32 to the discharge end thereof. The distances between successive indicia apertures 33 are thus equal to five times the length of an increment. Each hopper 41 is disposed above belt 32 a distance sufficient to permit the free passage of cigars as A thereunder, and is provided with an inclined base or guide 42 along which slides a pusher member 43, the reciprocation of which effects the discharge of a row of cigars from hopper 41 through a front opening therein onto a corresponding increment of belt 32.

The mechanism for intermittently simultaneously reciprocating pusher members 43 includes a pair of opposite bracket plates 44 and 46 affixed to and depending from frame 12 beneath each feed hopper 41. Supported by each pair of bracket plates 44, 46 at the bottoms thereof is a transversely aligned pair of bearing blocks 47 in which there is journalled a transverse shaft 48 projecting beyond each bearing block 47. Affixed to opposite ends of each shaft 48 and rockable therewith are upwardly-directed parallel arms 49 and 50 respectively, the upper ends thereof being connected by rearwardly-directed, upwardly-inclined links 51 to the trailing corners of pusher member 43. Rockably carried by each shaft 48 between the respective arm 50 and the adjacent bearing block 47 is a lever 52 having a depending lower section 53 and an upper section 54. A transverse collar 56 is mounted adjacent the free end of the upper section of lever 54 and is axially aligned with an opening therein. Formed in arm 50 is an opening 57, said opening 57 and collar 56 being equally radially spaced from shaft 48, and arm 50 having outwardly directed wings 58 in the vicinity of the opening 57. A coupling pin 59 slidably registers with collar 56 and is movable into and out of registry with opening 57 to effect the selective coupling and decoupling respectively of a corresponding lever 52 and arm 50. Coupling pin 59 terminates at its inner end in a peripherally grooved head 60.

A pair of longitudinally-spaced brackets 61 are mounted on the upper outer face of each plate 44 and have journalled therebetween a rod 63. Depending from rod 63 is a swingable control flap 64 having an arcuate bottom edge 65 slidably engaging the slot in coupling pin head 60 and having as its center of curvature the shaft 48. A helical compression spring 66 is entrapped between the confronting faces of flap 64 and plate 44 normally to swing flap 64 outwardly and coupling pin 59 to its engage position. A transverse shaft 67 extends through and is journalled to opposite plates 44 and 46 adjacent their trailing edges and has radially projecting handle members 68 affixed to the ends thereof. Handle 68 adjacent plate 44 includes a hub section 69 on which is mounted an L-shaped block 70 including an offset cam arm 71 located outside the flap 64 adjacent to an edge thereof, cam arm 71 having an inclined face 72 confronting flap 64 and adapted to engage the edge thereof. When handle 68 is swung to its upper position, as illustrated in FIGURE 12, cam surface 72 urges flap 64 rearwardly and arm 70 releasably locks it in such position against the pressure of spring 66 to lock coupling pin 59 releasably in its retracted disengage position. By swinging handle 68 to its horizontal position, as shown in FIGURES 11 and 13, cam arm 71 releases flap 64 which is thereupon swung outwardly by spring 66 to urge coupling pin 59 into engage position when aligned with aperture 57 in arm 50. Wings 58 prevent pin 59 from advancing beyond an edge of arm 50.

Depending from the lower end of each lever 52 is a pivoted link 73. Links 73 are joined by a common longitudinally extending connecting rod 74 which is connected to the respective links 73 by conventional U-bolts 76 adjustably clamping the links 73 to and along the connecting rod 74. Levers 52, links 73 and connecting rod 74 are so associated that levers 52 are parallel to each other and links 73 are parallel to each other. The drive for reciprocating rod 74 includes a pair of transversely spaced bearing brackets 77 mounted on platform 14 and rotatably supporting a transverse shaft 78 extending through the brackets 77. The inner end of shaft 78 has affixed thereto a sprocket wheel 79 which is connected by a sprocket chain 80 to a sprocket wheel 81 affixed to low speed drive shaft 36. The outer end of shaft 78 carries an electrical clutch C2, the drive section of which is connected to shaft 78 and the driven section of which has coaxially affixed thereto a disc wheel 83. The leading end of rod 74 is pin-connected to one end of a link 84, the other end of which engages a pin 86 mounted eccentrically on the front face of wheel 83 and offset relative to the axis thereof. A boss or detent 87 is positioned on the peripheral face of wheel 83.

A pair of arms 88 project forwardly of frame member 12 on opposite sides of drum 19 and carry upwardly directed bracket plates 89. A shaft 90 extends between and is suitably journalled to the upper rear corners of bracket plates 89. A gate or swingable flap 91 depends from shaft 90 to a point slightly above the level of belt 32 and extends for substantially the full width of the belt. The lower section of flap 91 includes a rearwardly downwardly inclined arm 92 terminating in a vertical offset leg 94. Located on flap 91, directly above the leg 92, and projecting forwardly thereof is the threaded shank of a threaded bolt 96 which is locked to flap 91 by a nut 97. An annular shaped counterbalance weight 98 having a topped axial bore engages screw 96 and is adjustably positioned along the length thereof, a nut 99 being provided for releasably locking weight 98 in any selected position. A switch mounting plate 100 is releasably affixed to the upper inner face of one bracket plate 89 by means of a suitable thumb screw.

Positioned along the side of conveyor belt 32 adjacent its leading end and laterally spaced therefrom is a cigar receiver and advancing system 101 which may define the input to a packaging machine or other handling equipment. The receiver 101 includes a pair of laterally extending upper and lower driven endless bands or belts 102 and 103 respectively. Belt 102 traverses a path about an upper trailing roll 104 and then along a horizontal forward run and belt 103 traverses a path about a lower trailing roll 106 and then along a horizontal forward run spaced below and parallel to the forward run of belt 102. Belts 102 and 103 are suitably driven in accordance with the demands and requirements of the subsequent handling equipment.

Directed into the path delineated by the forward runs of belts 102 and 103 and at substantially the level of the upper runs of the belts 32 and 103 is a laterally extending bridge plate 107 which is affixed to frame 12 and bridges the space between belts 32 and 103. In order to restrict the cigars along the conveyor 32 and plate 107, particularly during the transfer thereof, to an unbunched side-by-side relationship, there is provided a pair of longitudinally-spaced transversely extending horizontal parallel guide bars 108 spaced above the level of belt 32 and that of bridge plate 107, a distance slightly greater than the thickness of a cigar A. The trailing ends of the bars 108 are supported by a block 109 mounted on frame 12. The leading sections of bars 108 are affixed to the underface of a longitudinally extending cross piece 110 supported above the trailing section of bridge plate 107 by a pair of suitably mounted, longitudinally-spaced brackets 111.

In order to restrict or prevent the return movement of cigars A from plate 107 to belt 32 a gating mechanism 112 is provided at the transfer point (FIGS. 5 and 6). Formed in each of bars 108, adjacent the trailing end of bridge plate 107, is an elongated slot 113. A longitudinally-extending gate defining dog 114 swingably registers with each of slots 113, being hinged at its upper trailing corner to the trailing side faces of the slot 113 by a hinge pin 116. Dogs 114 are of substantially triangular configuration having a rearwardly directed rearwardly upwardly inclined edge 117 and a forwardly directed vertical edge 118 as when dog 114 is in its depressed or closed position of FIGURE 6. The downward movement of dog 114 to its depressed position is limited by a plate 118 of greater dimensions than that of slot 113, which plate is affixed to the top edge of the dog 114, and movable into engagement with the top face of bar 108. Dog 114 is resiliently urged to its depressed position by a leaf spring 120 having its trailing end affixed to bar 108 rearwardly of slot 113 and its leading section bearing on the top face of plate 119. As cigars are advanced from belt 32 to bridge plate 107 they bear on the dog cam surface 117 to raise the dog 114 and permit the free transfer of the cigars. However, when dog 114 is in its normal depressed position, the reverse movement of the cigars is prevented by the vertical leading edge 118 of dog 114, pressure against which does not raise dog 114.

The cigar transfer mechanism is positioned above belt 32 rearwardly of the flap 97 and includes a horizontal base plate 121 supported above belt 32 by means of a pair of brackets 122 mounted on opposite sides of frame member 12, the base plate 121 projecting beyond the side of frame 12 remote from the receiver 101. Mounted on the front side corners of base plate 121 are a pair of laterally-spaced bracket plates 123 provided with forwardly directed arms 126. Directed upwardly from bracket plates 123 are rear bearing blocks 127 and 128, and front bearing blocks 129 and 130, in longitudinal alignment with the respective rear bearing blocks 127 and 128 and located adjacent the free ends of arms 126. A longitudinal shaft 132 is journalled in bearing blocks 128 and 130, projects forwardly of bearing block 130 and has affixed to its leading end a dual sprocket wheel 133.

A longitudinal shaft 134 is journalled to and between bearing blocks 127 and 129, projects forwardly of bearing block 129 and has affixed to its leading end a dual sprocket wheel 136 similar to and in transverse alignment with sprocket wheel 133. Carried by and between sprocket wheel 133. Carried by and between sprocket wheels 133 and 136 are a pair of longitudinally spaced parallel sprocket chains 137 which are medially vertically aligned with the transversely extending space between the guide bars 108. An electric drive motor M1 is mounted on and adjacent the rear of base plate 121 and is connected to the input of a gear reduction unit 138 provided with a low speed output shaft 139. Shaft 139 is coupled, by way of an electrically actuated clutch C3, to the trailing end of shaft 134. In addition, an electrically-actuated brake B, of well-known construction, engages shaft 134 and the block 127 and effects the braking of shaft 134 upon electrical energization of brake B and releases the shaft upon deenergization of brake B.

A pair of pusher members 140 are carried by sprocket chains 137 at opposite spaced points along the length thereof. Each pusher member 140 includes a trapezoidally shaped support plate 141 having a leading base edge 142 and a trailing apex edge 142a. A pair of laterally-spaced brackets are mounted on the support plate 141 forward of its trailing edge and are provided with upright ears 143 having laterally aligned apertures formed therein. Ears 143 abut the outer faces of corresponding links 143a of the sprocket chains 137 and are pivoted thereto by the respective link-connecting pins 144 connecting links 143 to the next successive links. Screw-connected to the underface of plate 141 are a pair of laterally spaced guide blocks 146 located under the ears 142. These register with and are adapted to slide along the top faces of guide bars 108.

Depending from the leading edge 142 of each support plate 141 is a substantially coextensive E-shaped pusher plate 147 including a horizontal cross bar 148 and depending laterally spaced end legs 149 and intermediate leg 150. Legs 149 are longitudinally-spaced from the outer edges of the guide bars 108 and the intermediate leg 150 registers with the space between the guide bars. The pusher plate 147 is connected to the leading edge of the support plate 141 by a longitudinally extending interconnecting hinge 151 and is swingable between an advanced position perpendicular to plate 141 and a retracted rearwardly directed position. A pair of spaced hairpin springs 152 are connected to the knuckles of the hinge 151 by pins 153, and have opposing free arms bearing on the inner faces of plates 141 and 147 normally resiliently to urge pusher plate 147 to its advanced position at right angles to plate 141. It should be noted that upon energization of the motor M1 and the drive coupling of the shaft 134 thereto by means of the clutch C3, the sprocket chains 137 are driven to advance a pusher member 140 along guide bars 108 toward bridge plate 107, blocks 146 riding along the upper faces of guide bars 108 and end fingers 149 thereof traveling along the outer edges of bars 108 with intermediate finger 150 moving along the space between guide bars 108.

The network for controlling and effecting the proper sequence of operation of the present improved apparatus includes a first demand switch 1LS located at receiver 101 and provided with a switch-actuating sensing finger 156 disposed in the path of cigars A between belts 102 and 103, to swing upwarly in the presence of and downwardly in the absence of cigars to indicate demand therefor. In the depressed or cigar-demand position of sensing arms 156, switch 1LS is closed and in its raised position switch 1LS is open. A second switch 2LS is mounted on support plate 100 and includes a follower-carrying swingable actuating arm 157 bearing upon the front face of flap 91 and motivated thereby. When arm 157 is in its relatively raised position, as occasioned by the absence of cigars bearing on the flap 91 and by the rearward position of flap 91, switch 2LS is in open position. When arm 157 is depressed by the flap 91 under the urging of advancing cigars switch 2LS is closed. A switch 4LS is mounted of a front support leg 11, below drum 19, and has associated therewith an actuating arm 158 carrying at its end a follower roller 159 riding along the border of belt 32 and in the path of indicia apertures 33. When arm 158 is in its depressed position switch 4LS is opened. When arm 158 is in a raised position consequent to the registry of the roller 159 with an aperture 33 switch 4LS is closed. A switch 5LS is mounted on the platform 14 and is provided with a swingable follower carrying actuator arm 160 engaging the periphery of the wheel 83. Switch 5LS adjacent disc wheel 83 is normally closed when actuating arm 160 registers with detent 87 on the disc wheel 83. A pair of normally open switches 3LS and 6LS are located along the cigar-advancing path of pusher members 140, the switches being provided with swingable actuating arms 161 and 163 respectively depending in the path of pusher plates 141. Arm 161 is located at th etrailing end of the pusher member path remote from bridge plate 107 and arm 163 is located a short distance forwardly thereof. While a pusher member is in registry with arm 161 switch 3LS is closed and while in registry with arm 163 switch 6LS is closed.

Referring now to FIGURE 14 of the drawings, the circuit network, a pair of electrical lines X and Y are connected through a main switch SW to the usual source of alternating current, the drive motors M and M1 each being connected between lines X and Y. The conveyor clutch C is connected to a suitable source of direct current through series-connected, normally closed relay switches 4CR1 and 5CL1 actuated to their open positions by associated relay solenoids 4CR and 5CR respectively. Transfer clutch C3 is connected through a normally open relay switch 1CR2 and the brake B is connected through the normally closed relay switch 1CR3 to the direct current source, the relay switches 1CR2 and 1CR3 being respectively closed and opened by the energization of an associated relay solenoid 1CR.

Switch 4LS, a normally closed relay switch 6CR1, and relay solenoid 5CR are connected in series between the lines X and Y, relay switch 6CR1 being opened by the energization of a solenoid 6CR. A relay solenoid 7CR is connected through the switch 4LS across the lines XY and is also connected across the lines XY through the series-connected normally open relay switch 7CR1 and the normally closed relay switch 6CR2 actuated by the relay solenoids 7CR and 6CR respectively and shunting the switch 4LS. Relay solenoid 6CR is connected in series with the normally open relay switch 5CR2 actuated by relay solenoid 5CR and switch 5LS across lines XY and is also connected across lines XY in series with the normally open relay switches 6CR3 and 7CR2 actuated respectively by relay solenoids 6CR and 7CR. The single revolution clutch C2 is connected through the normally open relay switch 5CR3 actuated by relay solenoid 5CR, across lines XY.

The relay solenoid 4CR is connected in series with the normally closed relay switch 3CR1 and the switch 2LS across the lines XY the switch 3CR1 being actuated by a relay solenoid 3CR and the switch 2LS being shunted by a normally open relay hold switch 4CR2 actuated by the relay solenoid 4CR. The relay solenoid 1CR is connected between the lines X and Y in series with the normally open relay switch 4CR3 which is actuated by relay solenoid 4CR, and the switch 1LS, the switch 1LS being shunted by a normally open relay hold switch 1CR1 actuated by relay solenoid 1CR. A relay solenoid 2CR is connected in series with a normally open relay switch 1CR4 actuated by the relay solenoid 1CR, and the switch 6LS across the lines XY, the switch 6LS being shunted by a normally open relay switch 2CR1 actuated by the relay solenoid 2CR. The relay solenoid 3CR is connected in series with the normally open relay switch 2CR2 actuated by the relay solenoid 2CR, and the switch 3LS across the lines XY.

Considering now the operation of the apparatus described above, in the normal condition of the apparatus wherein there is no demand for cigars as indicated by the sensing arm 156, and a row of cigars engages flap 91, and switch arm 158 does not register with an aperture 33, the switches 1LS and 6LS are open and the switches 2LS and 3LS are closed. The switch 5LS is also open by reason of actuating detent 87 being past registry with the switch actuating arm 160 upon the completion of the cycle of the one revolution clutch C2. Inasmuch as closed switch 2LS energizes the relay solenoid 4CR, which is held by the closed relay switch 4CR2 in the absence of energization of relay solenoid 3CR, relay switch 4CR1 is held open thereby deenergizing conveyor clutch C and stopping the advance of conveyor 32. The energized solenoid 4CR also closes relay switch 4CR3.

When cigars A pass out of engagement with the sensing arm 156, the latter dropping to indicate a demand for cigars, switch 1LS is closed to energize the relay solenoid 1CR through closed relay switch 4CR3, which energized solenoid, in turn, closes the hold relay switch 1CR1 and relay switches 1CR2 and 1CR4 and opens relay switch 1CR3. The opening and closing of relay switches 1CR2 and 1CR3 respectively energizes clutch 3 and deenergizes brake B to drive sprocket wheel 136 and advance sprocket chains 137 and pusher members 140, thereby transferring the leading row of cigars from the conveyor 32 across the bridge plate 107 to receiver 101. As the pusher member advances it releases switch arm 161 to open switch 3LS and engages switch arm 163 to close momentarily the switch 6LS. The closing of switch 6LS energizes relay solenoid 2CR and the energized solenoid closes the hold relay switch 2CR1 to keep solenoid 2CR energized and closes relay switch 2CR2. Cigars A upon reaching and raising the sensing arm 156 open switch 1LS, which opening occurs before the completion of the transfer cycle. As one of the pusher members 140 leaves the path of the conveyor-carried cigars, the next pusher member 140 engages switch arm 161 to close switch 3LS and thereby energize relay solenoid 3CR to open relay switch 3CR1, deenergize relay solenoid 4CR, and return the system to its initial position except for the opening of switch 2LS. It should be noted that conveyor 32 is stopped during the complete transfer cycle.

Following the completion of the transfer cycle, switch 2LS being open by reason of the absence of cigars engaging flap 91, relay 4CR is deenergized and relay switch 4CR1 closed. Conveyor 32 is thus driven to advance the next successive row of cigars into engagement with flap 91 to close switch 2LS, energize relay solenoid 4CR which closes relay hold switch 4CR2 and opens relay switch 4CR1 to stop conveyor 32.

In the event that an indicia opening 33 is brought into registry with switch arm 158 before a row of cigars reaches flap 91, switch 4LS is closed to energize relay solenoid 5CR which opens relay switch 5CR1 to deenergize clutch C and stop conveyor 32. It is to be noted that, in this position of conveyor 32, each hopper 41 is aligned with a different increment of successive similar groups of such increments along the conveyor 32. The closing of switch 4LS also energizes relay solenoid 7CR. In addition to stopping conveyor 32 by opening relay switch 5CR1, the energized relay solenoid 5CR closes relay switches 5CR2 and 5CR3 and energized relay solenoid 7CR closes relay switches 7CR1 and 7CR2. The closing of relay switch 5CR3 energizes the one revolution clutch C2 which couples wheel 83 to the motor driven shaft 78 for a single revolution to reciprocate connecting rod 74 and simultaneously reciprocate the pusher members 43 and discharge a row of cigars from each hopper 41 into a correspondingly aligned increment of the conveyor 32. Upon approaching the termination of the single revolution of wheel 83, the detent 87 engages switch arm 160 momentarily to close switch 5LS. The closing of switch 5LS effects the energization of relay solenoid 6CR, which opens relay switches 6CR1 and 6CR2 and closes the relay hold switch 6CR3. The opening of relay switch 6CR1 deenergizes relay solenoid 5CR to close relay switch 5CR1 and thereby energizes clutch C to advance conveyor 32. The advancing conveyor 32 carries the indicia aperture 33 out of registry with switch arm 158 thereby to open switch 5LS. The opening of relay switch 6CR2 effects the deenergization of relay solenoid 7CR which in turn opens relay switches 7CR1 and 7CR2, the opening of the latter deenergizing relay solenoid 6CR, returning the relay system including relay solenoids 5CR, 6CR and 7CR to their initial conditions. Conveyor 32 will continue to advance until it is stopped by the closing of switch 2LS, as earlier explained.

It is to be noted that one or more of the feed hoppers 41 may be disabled by turning a corresponding handle 68 as aforesaid. However, apart from leaving corresponding increments of the conveyor belt 32 unoccupied by cigars this wil not affect the accurate operation of the apparatus. Belt 32 will travel to skip the unoccupied increment approaching the conveyor discharge end until the row of cigars occupying the next increment engages the flap 91. Moreover, the flap 91, in addition to actuating the switch 2LS serves to align the cigars transversely in the leading increment. The aligning pressure of the flap 91 is controlled by adjusting the conterweight 98 along screw bolt 96.

While there has been described and illustrated a preferred embodiment of the present invention, it is apparent that numerous alterations, omissions and additions may be made without departing from the spirit thereof.

Having described the invention, what is claimed and desired to be covered by Letters Patent is:

1. An article handling apparatus comprising an endless conveyor including successive longitudinal groups of a predetermined number of substantially equal increments and successive indicia longitudinally-spaced by said predetermined number of increments, a plurality of longitudinally-spaced intermittently actuatable article delivering means disposed alonog said conveyor, the spacing between successive delivery means being a multiple of said increments different from the number of increments in said group and said delivery means registering with different increments in said respective groups, a first sensing means actuated by said indicia, selectively actuatable means advancing said conveyor from the trailing toward the leading end thereof, and means responsive to said sensing means deactivating said advancing means and concurrently actuating said plurality of article delivery means.

2. An article handling apparatus comprising an endless conveyor including successive longitudinal groups of a pretermined number of substantially equal increments and successive indicia longitudinally-spaced by said predetermined number of increments, a plurality of longitudinally-spaced intermittently actuatable article delivering means disposed along said conveyor, the spacing between successive delivery means being a multiple of said increments different from the number of increments in said group and said delivery means registering with different increment in said respective groups, a first sensing means actuated by said indicia, selectively actuatable means advancing said conveyor from the trailing toward the leading end thereof and means responsive to said sensing means deactivating said advancing means and concurrently actuating said plurality of article delivery means and thereafter actuating said conveyor advancing means.

3. An article handling apparatus comprising an endless conveyor including successive longitudinal groups of a pretermined number of substantially equal increments and successive indicia longitudinally-spaced by said predetermined number of increments, a plurality of longitudinally-spaced intermittently actuatable article delivering means disposed along said conveyor, the spacing between successive delivery means being a multiple of said increments different from the number of increments in said group and said delivery means registering with different increments in said respective groups, a first sensing means actuated by said indicia, selectively actuatable means advancing said conveyor from the trailing toward the laeding end thereof, means responsive to said first sensing means deactivating said advancing means and concurrently actuating said plurality of article delivery means, and a second sensing means responsive to articles carried by said conveyor adjacent its leading end to deactivate said conveyor advancing means.

4. An article handling apparatus comprising an endless conveyor including successive longitudinal groups of a predetermined number of substantially equal increments and successive indicia longitudinally-spaced by said predetermined number of increments, a plurality of longitudinally-spaced intermittently actuatable article delivering means disposed along said conveyor, the spacing between successive delivery means being a multiple of said increments different from the number of increments in said group and said delivery means registering with different increments in said respective groups, a first sensing means actuated by said indicia, selectively actuatable means advancing said conveyor from the trailing toward the leading end thereof, means responsive to said first sensing means deactivating said advancing means and concurrently actuating said plurality of article delivery means and thereafter actuating said conveyor advancing means, and a second sensing means responsive to articles carried by said conveyor adjacent its leading end to deactivate said conveyor advancing means.

5. An article handling apparatus comprising an endless conveyor including successive longitudinal groups of a pretermined number of substantially equal increments and successive indicia longitudinally-spaced by said predetermined number of increments, a plurality of longitudinally-spaced intermittently actuatable article delivering means disposed along said convyeor, the spacing between successive delivery means being a multiple of said increments different from the number of increments in said group and said delivery means registering with different increments in said respective groups, a first sensing means actuated by said indicia, selectively actuatable means advancing said conveyor from the trailing toward the leading end thereof, means responsive to said first sensing means deactivating said advancing means and concurrently actuating said plurality of article delivery means, a receiving device located adjacent a side of the leading end of said conveyor, a transfer member movable transversely across said conveyor to transfer articles carried by said conveyor to said receiving device, selectively actuatable means advancing said transfer member, a third sensing means located in the path of said articles on said receiver, and means responsive to said third sensing means actuating said transfer advancing means upon the absence of an article in registry with said sensing means.

6. An article handling apparatus comprising an endless conveyor including successive longitudinal groups of a predetermined number of substantially equal increments and successive indicia longitudinally-spaced by said predetermined number of increments, a plurality of longitudinally-spaced intermittently actuatable article delivering means disposed along said conveyor, the spacing between successive delivery means being a multiple of said increments different from the number of increments in said group and said delivery means registering with different increments in said respective groups, a first sensing means actuated by said indicia, selectively actuatable means advancing said conveyor from the trailing toward the leading end thereof, means responsive to said sensing means deactivating said advancing means and concurrently actuating said plurality of article delivery means and thereafter actuating said conveyor advancing means, a second sensing means responsive to articles carried by said conveyor adjacent its leading end to deactivate said conveyor advancing means, a receiving device located adjacent a side of the leading end of said conveyor, a transfer member movable transversely across said conveyor to transfer articles carried by said conveyor to said receiving device, selectively actuatable means advancing said transfer member, a third sensing means located in the path of said articles on said receiver, and means responsive to said third sensing means actuating said transfer advancing means upon the absence of an article in registry with said sensing means.

7. The article handling apparatus of claim 6, wherein said second sensing means comprises a flap member extending transversely across said conveyor adjacent the leading end thereof and in the path of articles carried thereby, said flap member being hinged above its lower edge to swing about a transverse horizontal axis, and a first switch movable between an open and closed position and including a switch arm actuated by said flap.

8. The article handling apparatus of claim 7, wherein said conveyor advancing means includes an electric motor, a conveyor drive shaft, an electrically actuatable clutch connecting said motor to said conveyor drive shaft, and means responsive to said first switch electrically connecting said clutch to a source of electric current.

9. The article handling apparatus of claim 6, including means to disable said conveyor-advancing means during the movement of said transfer member.

10. The article handling apparatus of claim 6, including means responsive to the location of said transfer member in the path of articles carried by said conveyor to disable said conveyor-advancing means.

11. The article handling apparatus of claim 6, including means responsive to said second sensing means to disable said transfer member advancing means in the absence of articles positioned in the transfer path thereof.

12. The article handling apparatus of claim 6, wherein said means for actuating said article delivery means includes a motor, an article delivery drive shaft, means including an electrically actuated single revolution clutch connecting said motor to said article delivery drive shaft, and means responsive to said first sensing means connecting said single revolution clutch to a source of current.

13. The article handling apparatus of claim 12, including means responsive to the cycling of said single revolution clutch to disable said conveyor advancing means.

14. The article handling apparatus of claim 6, including a dog member located in the transverse transfer path of said articles between said conveyor and said receiver, said dog member being movable out of said path upon the urging of advancing articles and preventing return movement thereof past said dog member.

References Cited by the Examiner
UNITED STATES PATENTS

| | | | |
|---|---|---|---|
| 723,504 | 3/03 | Titus | 198—208 |
| 724,240 | 3/03 | Baker | 198—32 X |
| 1,094,780 | 4/14 | Depew | 198—170 |
| 1,977,307 | 10/34 | Hayssen | 198—37 X |
| 1,980,411 | 11/34 | Kimball | 198—32 |
| 2,415,941 | 2/47 | Edson | 198—32 X |
| 2,551,512 | 5/51 | Thompson | 198—208 |
| 2,603,340 | 7/52 | Warren | 198—32 |
| 2,687,797 | 8/54 | Hirsch | 198—32 |
| 3,105,587 | 10/63 | Boesch | 198—32 X |

SAMUEL F. COLEMAN, *Primary Examiner.*

EDWARD A. SROKA, *Examiner.*